(12) United States Patent
Abe

(10) Patent No.: US 8,593,350 B2
(45) Date of Patent: Nov. 26, 2013

(54) WIRELESS COMMUNICATION TERMINAL

(75) Inventor: Yasuhiro Abe, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/091,873

(22) PCT Filed: Oct. 25, 2006

(86) PCT No.: PCT/JP2006/321281
§ 371 (c)(1),
(2), (4) Date: Apr. 28, 2008

(87) PCT Pub. No.: WO2007/049648
PCT Pub. Date: May 3, 2007

(65) Prior Publication Data
US 2009/0115668 A1     May 7, 2009

(30) Foreign Application Priority Data

Oct. 28, 2005 (JP) ................................ 2005-314318

(51) Int. Cl.
*H01Q 1/24* (2006.01)
(52) U.S. Cl.
USPC ........................................ 343/702; 455/575
(58) Field of Classification Search
USPC ................... 343/702, 700 MS; 455/295, 575
See application file for complete search history.

(56) References Cited

U.S. PATENT DOCUMENTS

| 5,227,805 A * | 7/1993 | King et al. ................ 343/702 |
| 5,564,083 A * | 10/1996 | Lee et al. .................. 455/575.7 |
| 7,025,266 B2 | 4/2006 | Keithley |
| 7,099,631 B2 * | 8/2006 | Lee et al. .................. 455/90.1 |
| 7,268,731 B2 * | 9/2007 | Chiang et al. ............. 343/702 |
| 7,280,075 B2 | 10/2007 | Koyama et al. |
| 7,398,113 B2 * | 7/2008 | Kozakai et al. .......... 455/575.7 |
| 2002/0022459 A1 * | 2/2002 | Kobayashi ................. 455/90 |
| 2005/0059425 A1 * | 3/2005 | Wang et al. .............. 455/550.1 |

FOREIGN PATENT DOCUMENTS

| JP | 5011501 U | 2/1993 |
| JP | 9321529 A | 12/1997 |
| JP | 10163748 A | 6/1998 |
| JP | 11312912 A | 11/1999 |
| JP | 2000196487 A | 7/2000 |

(Continued)

OTHER PUBLICATIONS

International Search Report for corresponding WO application No. PCT/JP2006/321281 lists the references above.

(Continued)

*Primary Examiner* — Hoang V Nguyen
*Assistant Examiner* — Kyana R McCain
(74) *Attorney, Agent, or Firm* — DLA Piper LLP (US)

(57) ABSTRACT

A wireless communication terminal comprises: a first circuit board 22 to which a reference potential pattern 32 is provided and an electric component is arranged; a case body 24 attached to the first circuit board 22 and including a conducting portion 38 which is electrically conducted to the reference potential pattern and covers the electronic component in a state where the case body is attached and a non-conducting portion 40 including no electric conductivity; and a housing 8 which houses therein the first circuit board 22 and the case body 24. An antenna 50 is formed on the non-conducting portion 40 and the antenna 50 is insulated from the conducting portion 38 and electric power is supplied to the antenna 50 from the first circuit board 22.

12 Claims, 8 Drawing Sheets

(56) References Cited

FOREIGN PATENT DOCUMENTS

| | | | |
|---|---|---|---|
| JP | 2001160706 A | 6/2001 | |
| JP | 2002064601 A | 2/2002 | |
| JP | 2005051769 A | 2/2005 | |
| JP | 2005124033 A | 5/2005 | |
| JP | 2006238204 A | 9/2006 | |

OTHER PUBLICATIONS

Japanese language office action dated Jul. 19, 2011 and its English language translation for corresponding Japanese application 2005314318 cites the foreign patent documents above.

* cited by examiner

WIRELESS COMMUNICATION TERMINAL

CROSS-REFERENCE TO THE RELATED APPLICATION

This application is a national phase of international application No. PCT/JP2006/321281 filed Oct. 25, 2006, the entire contents of which are incorporated by reference. This application also claims benefit of priority under 35 U.S.C. §119 to Japanese Patent Application No. 2005-314318 filed Oct. 28, 2005, the entire contents of which are incorporated by reference.

TECHNICAL FIELD

The present invention is related to a wireless communication terminal in which an antenna is installed inside a housing.

BACKGROUND ART

Among wireless communication terminals such as portable telephones, there is provided a wireless communication terminal in which users extend extensible antenna mounted on a wireless communication terminal along the length direction thereof to outside, and performs communication operations such as telephone communications.

However, since such extensible antennas are extended outside the wireless communication terminal, the dimension of the wireless communication terminal along length direction thereof increases. Therefore, this may cause a difficulty in making this type of wireless communication terminal compact. As a consequence, other types of wireless communication terminal are proposed (refer to, for example, patent publications 1 and 2): That is, instead of the antennas which extends outside the wireless communication terminal, built-in type antenna is provided inside a housing thereof so that the wireless communication terminal can be maintained in a compact state even during communication operation.

A housing of a wireless communication terminal related to the patent publications 1 and 2 is configured such that an upper case (front case) is coupled with a lower case (rear case) so as to secure a space inside, while a built-in type antenna is fixed on an inner wall face of the lower case. A circuit board is housed inside the housing, a shield case for covering a face of the circuit board on the side of the lower case is provided on the circuit board in order to prevent electromagnetic noises and the like generated from external sources from influencing electronic components and the like provided on the circuit board.

Also, as another wireless communication terminal different from the above-described wireless communication terminal related to the patent publications 1 and 2, for example, there is provided a wireless communication terminal as described in Japanese Patent Application No. 2005-051769 (Japanese Patent Application Publication No. 2006-238204). In the wireless communication terminal, since an interval between a circuit board and an inner wall face of a lower case of the housing is made narrow, a built-in type antenna is provided on the circuit board, and a shield case is mounted to the circuit board from the upper case side of the housing.

Patent Publication 1: JP-A-11-312912
Patent Publication 2: JP-A-10-163748

DISCLOSURE OF THE INVENTION

Problems that the Invention is to Solve

However, the wireless communication terminal related to Japanese Patent Application No. 2005-051769 has a problem: That is, in order to prevent a deterioration of a gain of the antenna, the antenna must be arranged on the circuit board away from the ground (namely, metal portion where reference potential is electrically conducted). Therefore, in order to secure the distance between the antenna and the ground, the circuit board cannot be made compact, which may eventually causes a difficulty in making the wireless communication terminal compact.

In view of the above problem, the present invention has an object to provide a wireless communication terminal capable of making the wireless communication terminal compact even if an antenna is installed inside a housing thereof.

Means for Solving the Problems

To solve the above-described problem a wireless communication terminal according to the present invention comprises:

a first circuit board including a reference potential pattern and an electronic component;

a case body attached to the first circuit board, the case body including a conducting portion which is electrically conducted to the reference potential pattern and covers the electronic component in a state where the case body is attached to the first circuit board, and a non-conducting portion including no electric conductivity; and a housing which houses therein the first circuit board and the case body, wherein:

an antenna is formed on the non-conducting portion, and the antenna is insulated from the conducting portion and supplied with electric power from the first circuit board.

In the wireless communication terminal according to the present invention, the first circuit board includes a power supply terminal within an area opposite to the non-conducting portion, and the power supply terminal is configured to abut on the antenna.

In the wireless communication terminal according to the present invention, a matching circuit portion for the antenna is provided on the first circuit board at a position corresponding to the power supply terminal on a face opposite to a face on which the power supply terminal is provided.

In the wireless communication terminal according to the present invention, the conducting portion includes:

a conducting flat plate portion formed in parallel to the first circuit board; and a conducting rib which stands on the conducting flat plate portion to a side of the first circuit board and abuts on the reference potential pattern, and which surrounds at least a portion of an area of the first circuit board, on which the electronic component is disposed, and the non-conducting portion includes:

a non-conducting flat plate portion formed in parallel to the first circuit board, wherein a face of the non-conducting flat plate portion opposite to the first circuit board is arranged adjacently in a same plane as a face of the conducting flat plate portion opposite to the first circuit board; and a non-conducting rib which stands on the non-conducting flat plate portion to the side of the first circuit board at a same height as the conducting rib.

The wireless communication terminal according to the present invention further comprises a second circuit board which includes a key switch and which is provided on a faces of the conducting flat plate portion and the non-conducting flat plate portion at an opposite side of the first circuit board.

Further, to solve the above-described problem, in the wireless communication terminal according to the present invention, the antenna is formed over both of a face of the non-conducting flat plate portion, which faces the first circuit board, and an inside face of the non-conductive rib which stands on the non-conducting flat plate portion to the first circuit board.

To solve the above-described problem, the wireless communication terminal according to the present invention, the non-conducting portion and the conducting portion are configured as separate members which are engaged with each other, or are configured as an integral member.

Further, to solve the above-described problem, in the wireless communication terminal according to the present invention, a core member of the case body includes no electric conductivity;

the conducting portion is configured by forming an electric conductive layer on a face of the core member except for the non-conducting portion; and the antenna is configured to be an electric conductive layer which is formed to have a predetermined plane shape on the face of the core member of the non-conducting portion.

Advantage of the Invention

In accordance with such a wireless communication terminal of the present invention, even when the antenna is installed inside the housing thereof, the wireless communication terminal can be made compact.

Figure 1:
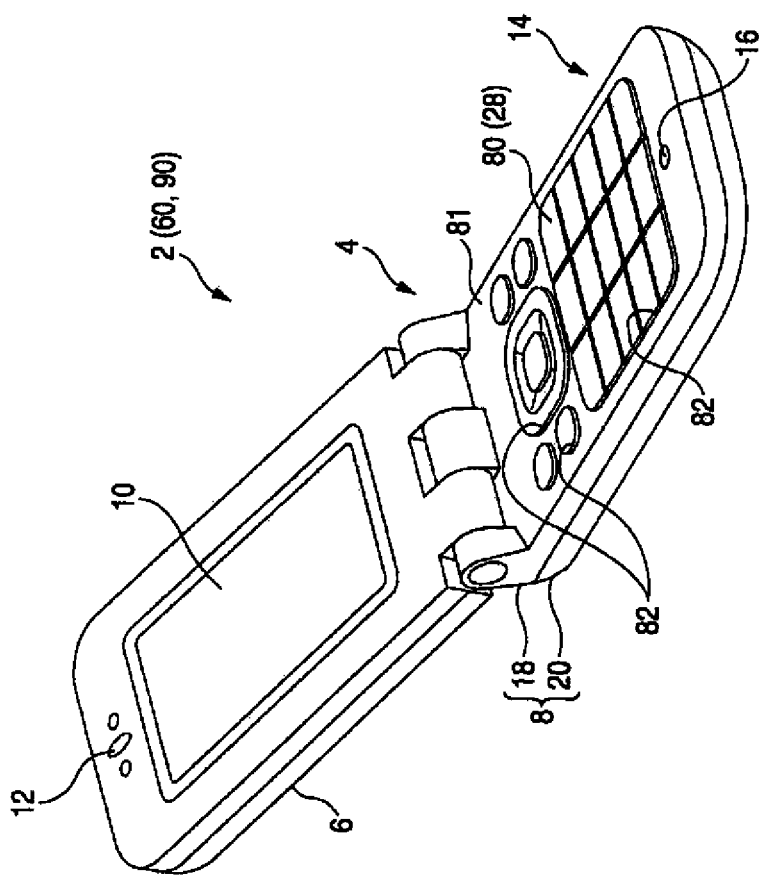
FIG. 1 is a perspective view for showing folding type portable telephones 2, 60, and 90, according to first to third embodiments of the present invention.

DESCRIPTION OF REFERENCE NUMERALS AND SIGNS 2 folding type portable telephone
4 hinge
6 first housing
8 second housing
10 display unit
12 speaker
14 operation unit
16 microphone
18 upper case
20 lower case
22 rigid board
22a first face
22b second face
24 case body
28 key FPC
28a first face
28b second face
30 key seat
32 reference potential pattern
34 terminal
36 antenna matching circuit portion
38 conducting portion
40 non-conducting portion
42 conducting flat plate portion
42a face
44 conducting rib
44a engaging portion
46 non-conducting flat plate portion
46a, 46b face
48 non-conducting rib
48a engaged portion
50 antenna
50a enlarged width portion
60 folding type portable telephone
62 case body
64 non-conducting portion
66 antenna
66a enlarged width portion
78 seat
80 keytop
81 operation face
82 keyhole
84 key switch
86 metal dome
90 holding type portable telephone
92 case body
94 conducting portion
96 non-conducting portion
98 conducting flat plate portion
98a face
100 conducting rib
102 non-conducting flat plate portion
102a face
104 non-conducting rib
106 antenna
106a enlarged width portion

BEST MODE FOR CARRYING OUT THE INVENTION

Referring now drawings, a description is made of embodiments as to wireless communication terminals according to the present invention.

FIG. 1 to FIG. 4 are diagrams to be observed in order to describe a folding type portable telephone 2 (corresponding to a wireless communication terminal) according to a first embodiment of the present invention.

As shown in FIG. 1, the folding type portable telephone 2 according to the present embodiment includes a first housing 6 and a second housing 8, while the first housing 6 is coupled via a hinge 4 to the second housing 8 in a rotationally movable manner. The first housing 6 includes both a display unit 10 and a speaker 12, and the speaker 12 is arranged at a position of the first housing 6, which is located near an edge portion thereof on the opposite side from the hinge 4 along a long length direction of the first housing 6. Also, the second housing 8 includes an operation unit 14 and a microphone 16, and the microphone 16 is arranged at a position of the second housing 8, which is located near an edge portion thereof on the opposite side from the hinge 4 along a long length direction of the second housing 8.

Figure 2:
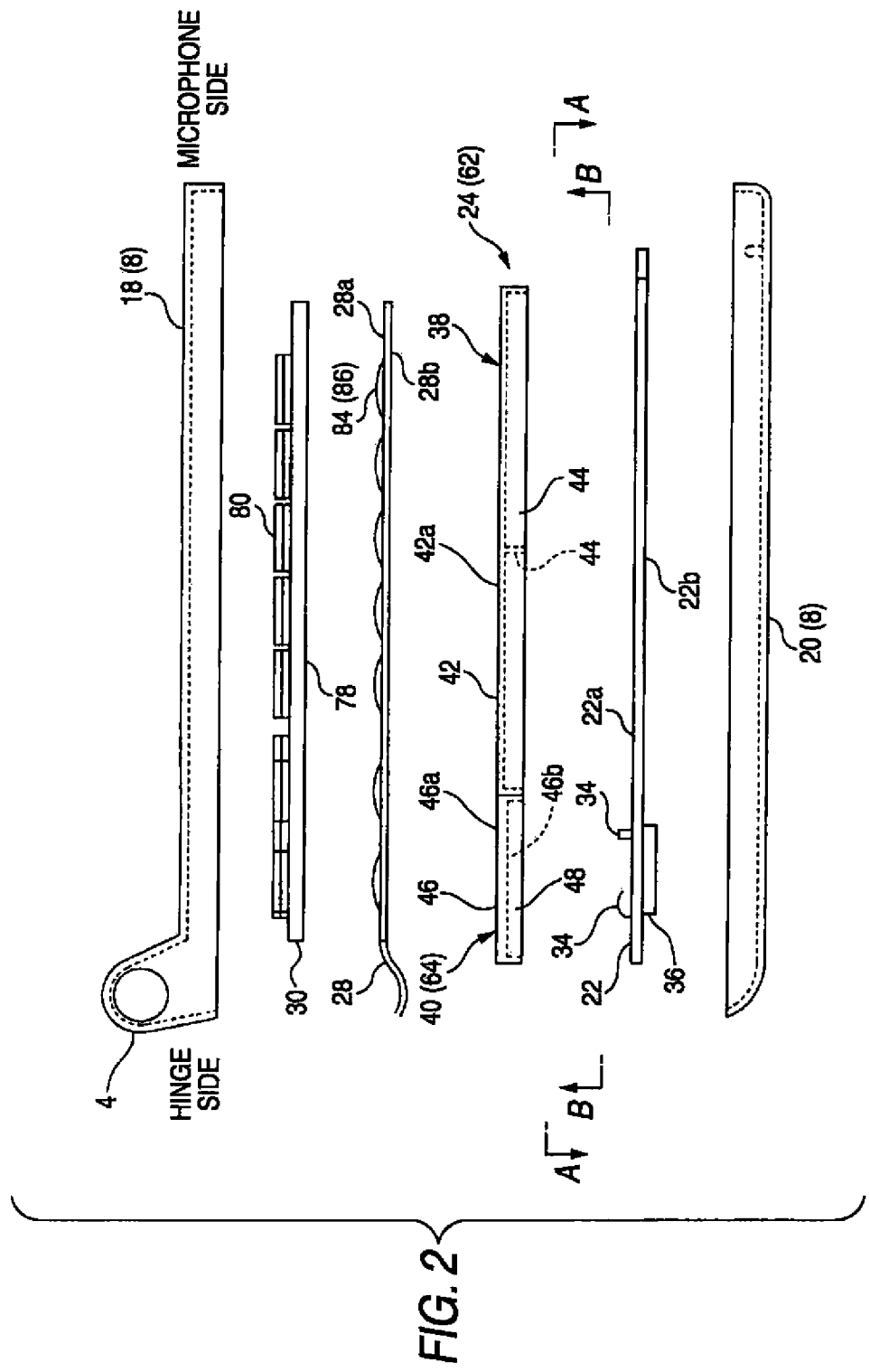
FIG. 2 is an exploded side view for indicating the folding type portable telephone 2, 60 according to the first and second embodiment before an upper case 18 and a lower case 20 of a second housing 8 and a rigid board 22, case bodies 24 and 62, a key FPC 28, and a key seat 30 which are housed in the second housing 8 as shown in FIG. 1 are assembled.

The second housing 8 includes an upper case 18 having an operation unit 14, and a lower case 20 located on the rear side of the upper case 18. As shown in FIG. 2, a rigid board 22 (corresponding to a first circuit board); a case body 24; a key FPC (Flexible Printed Circuit) 28 (corresponding to a second circuit board); and a key seat 30 are housed in an inner space formed between the above-described upper case 18 and lower case 20 in this order from the side of the lower case 20.

Figure 3:
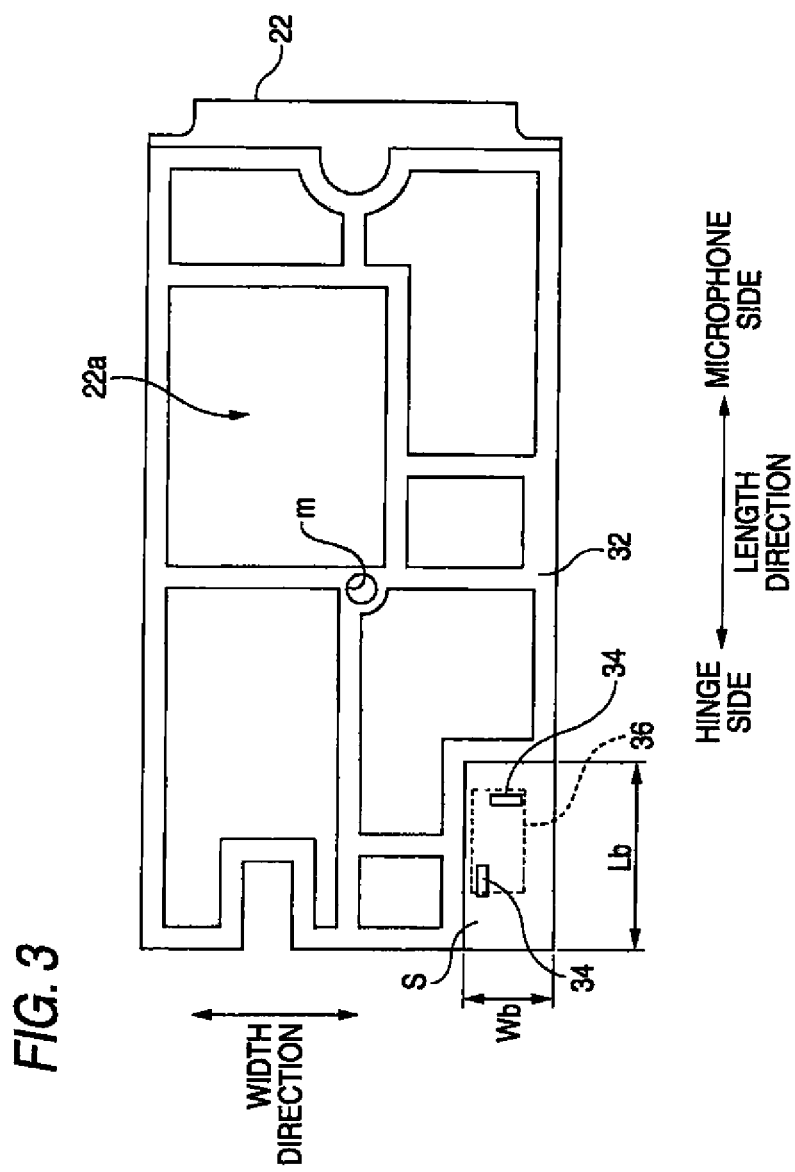
FIG. 3 is a diagram for showing the rigid board 22 shown in FIG. 2, taken along an arrow A-A line.

Various sorts of electronic components (not shown) are arranged on a first face 22*a* of the rigid board 22 and a second face 22*b* thereof. The first face 22*a* of the rigid board 22 is located on the side of the upper case 18, whereas the second face 22*b* is located opposite to the first face 22*a*. Also, as shown in FIG. 3, a reference potential pattern 32 is printed on the first face 22*a* of the rigid board 22.

As to the rigid board 22, an area "S" (namely, such an area indicated by dimension "Lb" and dimension "Wb" shown in FIG. 3) of one corner portion on the first face 22*a* on the side of the hinge 4 is located opposite to a non-conducting portion 40 (will be explained later), while two pieces of leaf spring type terminals 34 are provided within this area S. As will be described later, these two leaf spring type terminals 34 abut on an antenna 50 so as to supply electric power.

The above-described reference potential pattern 32 is designed not to be formed on this area "S." Also, except for wiring patterns (not shown) which are connected to the respective terminals 34, such wiring patterns which are connected to the electronic components (not shown) other than the terminals 34 are designed to pass through the area "S" as less as possible.

Although not shown in the drawing, as to this rigid board 22, no reference potential pattern is not formed within the area "S" even on the second face 22*b* located opposite to the first face 22*a*, and furthermore, a wiring pattern passes through this area "S" as less as possible. In such a case that the rigid board 22 is made of a multilayer board, internal layers of this multilayer board are formed in a similar manner to the above-described manner.

Also, as shown in FIG. 2 and FIG. 3, in the rigid board 22, an antenna matching circuit portion 36 is provided at a position on the second face 22*b*, which corresponds to the terminal 34. The antenna matching circuit portion 36 has a function capable of adjusting an impedance so as to match a resonant frequency with a desired frequency.

Figure 4:
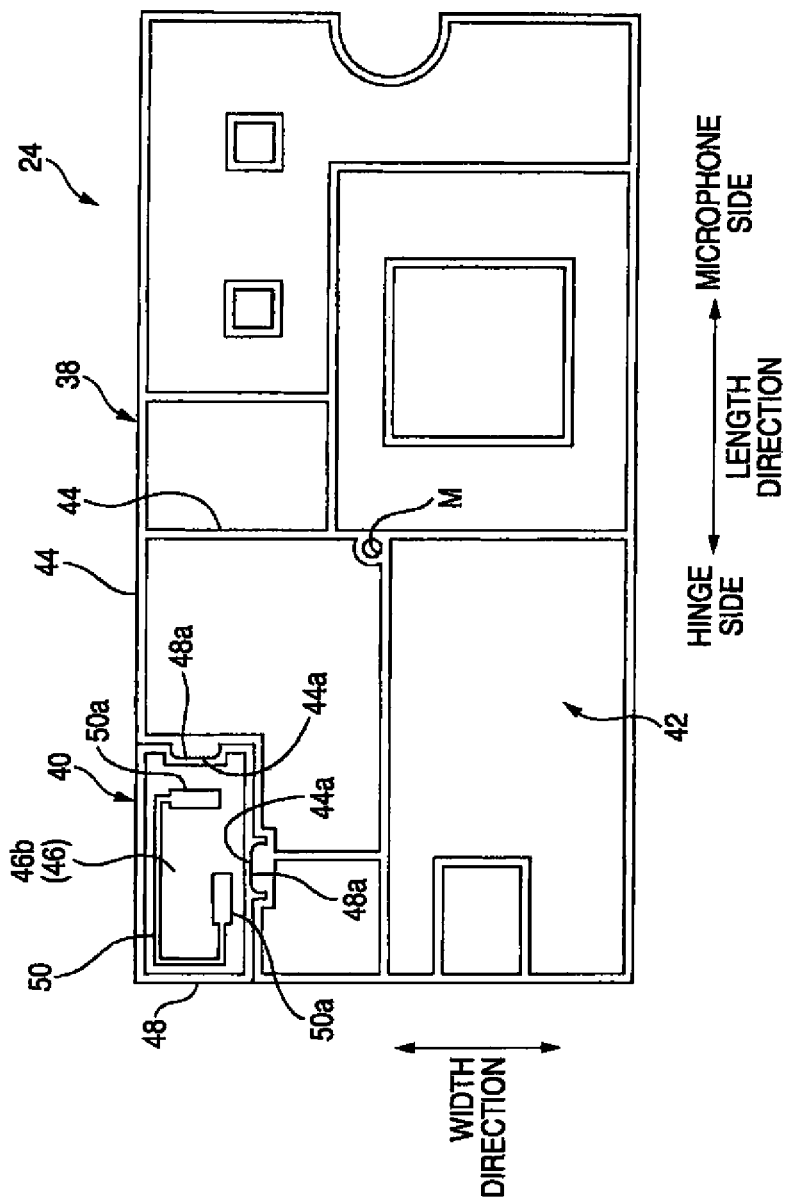
FIG. 4 is a diagram for indicating the case body 24 shown in FIG. 2, taken along an arrow B-B line.

Next, as shown in FIG. 2 and FIG. 4, the case body 24 includes a conducting portion 38 and the non-conducting portion 40 which is engaged with the conducting portion 38. As shown in FIG. 4, a plane shape of this non-conducting portion 40 is made in a substantially rectangular shape. The plane shape of the non-conducting portion 40 is made wider than the area "S" (refer to FIG. 3) on the rigid board 22 located opposite thereto. In a state where the case body 24 is mounted on the rigid board 22, the area "S" is covered only by the non-conducting portion 40.

While a plane shape of the conducting portion 38 shown in FIG. 4 is made in a substantially rectangular shape, one corner thereof on the side of the hinge 4 is cut off in such a shape corresponding to the plane shape of the non-conducting portion 40. As a result, in a state where the conducting portion 38 is engaged with the non-conducting portion 40, the case body 24 is configured such that an entire plane shape of this case body 24 becomes a substantially rectangular shape.

As shown in FIG. 2 and FIG. 4, the conducting portion 38 includes a conducting flat plate portion 42, and a conducting rib 44. The conducting flat plate portion 42 is formed in parallel to the plane direction of this conducting portion 38. The conducting rib 44 is formed integrally with the conducting flat plate portion 42 to stand thereon, and has a height on the side of the rigid board 22 (namely, front side in the right angle direction with respect to the sheet of FIG. 4). The height of this conducting rib 44 is made sufficiently higher than heights of electronic components which are mounted on the first face 22*a* of the rigid board 22.

The conducting rib 44 is formed on the entire circumference of the edge portion of the conducting flat plate portion 42 and at a predetermined position inside this conducting flat plate portion 42 in order that the flat plane shape of the conducting flat plate portion 42 is segmented into a plurality of areas. Plane shapes of the respective areas segmented on the conducting flat plate portion 42 by this conducting rib 44 are formed to have similar shapes to the plane shapes of the respective areas segmented on the face 22*a* of the rigid board 22 shown in FIG. 3 by the reference potential pattern 32 in a state where these planes opposite to each other.

Also, while a synthetic resin material having a non-conductive characteristic and a hard characteristic is employed as a core material of the conducting portion 38 shown in FIG. 4, an electric conductive layer made of a metal material is formed on entire regions as to a front surface side of the core material and a rear surface side thereof. Apparently, the above-described electric conductive layer may be alternatively formed by performing a plating method, or a sputtering method.

Also, the non-conducting portion 40 includes a non-conducting flat plate portion 46 and a non-conducting rib 48. The non-conducting flat plate portion 46 is formed in parallel to the plane direction of the non-conducting portion 40. The non-conducting rib 48 is formed on the entire circumference of the edge portion of this non-conducting flat plate portion 46 to stand on the side of the rigid board 22 (namely, front side in the right angle direction with respect to the sheet of the figure).

Then, as to the non-conducting rib 48 of the non-conducting portion 40, engaged portions 48*a* having concave shapes are formed at intermediate positions of such portions formed on two edges which are located adjacent to the conducting portion 38. Also, as to the conducting rib 44 of the conducting portion 38, engaging portions 44*a* having convex shapes are formed at intermediate positions of such portions formed on two edges which are located adjacent to the non-conducting portion 40 on the outer shape in the plane shape of this conducting portion 38. Since the engaging portions 44*a* are mutually engaged with the engaged portions 48*a*, the conducting portion 38 is assembled with the non-conducting portion 40 in an integral manner so as to be fixed with each other.

Also, as shown in FIG. 2, in a state where the non-conducting portion 40 is engaged with the conducting unit 38, a face 46*a* of the non-conducting flat plate portion 46 on the side of the upper case 18 is arranged adjacently in a same plane as a face 42*a* of the conducting flat plate portion 42 in the conducting portion 38 on the side of the upper case 18. Also, the non-conducting rib 48 of the non-conducting unit 40 has the same height as the height of the conducting rib 44 of the conducting portion 38.

As shown in FIG. 4, an antenna 50 having a metal layer which is formed by a vapor deposition method, or the like, is manufactured on a face 46b of the non-conducting flat plate portion 46 of the non-conducting portion 40, which is located opposite to the face 46a thereof. This antenna 50 is formed such that the antenna 50 is bent in a band shape along a peripheral edge of the face 46b, and includes enlarged width portions 50a on both edge portions thereof along a length direction of this antenna 50. Further, since the antenna 50 is not contacted to the conducting portion 38 even in a state where the non-conducting portion 40 is engaged with the conducting portion 38, the antenna 50 is electrically insulated from the conducting portion 38.

As shown in FIG. 2, the case body 24 is attached to the rigid board 22 while the conducting portion 38 is engaged with the non-conducting portion 40, the edge faces of the conducting rid 44 and of the non-conducting rid 48 along the height directions thereof abut on the first face 22a of the rigid board 22. Then, in a state where the case body 24 is mounted on the rigid board 22, a male screw (not shown) penetrates through a hole "M" and another hole "m" of the rigid board 22 shown in FIG. 3, and thereafter, is fastened to a female screw (not shown). The hole "M" is formed at a substantially center position of the conducting portion 38 shown in FIG. 4. The hole "m" of the rigid board 22 is formed in order to be positioned on a coaxial line with respect to the hole "M." The female screw is formed on an inner side face of a bottom wall of the lower case 20 shown in FIG. 2. As a result, due to fastening force exerted from the male screw (not shown), depressing force is given along the thickness direction of the rigid board 22 to a space of the contact portion between the rigid board 22 and the case body 24.

In a state where the case body 24 is attached to the rigid board 22, the conducting portion 38 of the case body 24 covers such an area (namely, substantially entire area except for area "S" in FIG. 3) where the electronic components (not shown) are arranged over the first face 22a of the rigid board 22 shown in FIG. 3.

Also, as shown in FIG. 4, the conducting rib 44 of the conducting portion 38 is formed such that the plane shape of this conducting portion 38 is segmented. As a result, the conducting rib 44 of the conducting portion 38 segments the area on which the electronic components (not shown) are arranged over the rigid board 22 into a plurality of segmented areas, and also, covers the plurality of segmented areas.

Also, in the conducting portion 38, the conducting rib 44 thereof is contacted with the reference potential pattern 32 on the first face 22a of the rigid board 22, so that the electric conductive layer formed on the surface of the conducting portion 38 is electrically conducted to the reference potential pattern 32 and thus has the same potential as that of the reference potential pattern 32. As a result, the conducting portion 38 functions as a shield case.

Also, a tab (namely, compact spring terminal, and not shown) is arranged on the reference potential pattern 32 of the rigid board 22 shown in FIG. 3. Then, as described above, the depressing force is exerted between the conducting portion 38 of the case body 24 and the rigid board 22 due to the fastening force of the male screw (not shown) which penetrates through the hole "M" of the conducting portion 38 shown in FIG. 4 and also the hole "m" of the rigid board 22 shown in FIG. 3 to the lower case 20, so that the tab (not shown) arranged on the reference potential pattern 32 in the rigid board 22 is contacted to the conducting portion 38 under pressure condition, and thus, can be firmly and electrically conducted thereto. As a result, the electric conductive layer of the surface of the conducting portion 38 surely has the same potential as that of the reference potential pattern 32. As a consequence, the conducting portion 38 can surely function as the shield case.

The conducting portion 38 can function as the shield case so as to avoid that noises generated outside the folding type portable telephone 2 would give influences to the plurality of electronic components (not shown) mounted on the first face 22a of the rigid board 22, and furthermore, to avoid that noises generated from the plural electronic components (not shown) would give influences to these electronic components to each other, which are provided in the respective areas segmented by the conducting rib 44, or would be wrapped around the antenna 50.

For instance, the conducting portion 38 avoids that this conducting portion 38 absorbs noises radiated from a high frequency circuit such as an RF (Radio Frequency) module (not shown), and then, gives influences to a baseband chip set (not shown) and the like which are arranged on the first face 22a of the rigid board 22. The RF module is arranged on the first face 22a of the rigid board 22 shown in FIG. 2, and produces wireless frequencies.

Also, in a state where the case body 24 is mounted on the rigid board 22, each of the two terminals 34 of the rigid board 22 abuts on the enlarged width portion 50a of the antenna 50 formed on the non-conducting flat plate portion 46 in the non-conducting portion 40 shown in FIG. 4 in order to supply electric power to the antenna 50.

Next, as shown in FIG. 2, the key seat 30 is disposed in parallel to the conducting flat plate portion 42 of the conducting portion 38 and the non-conducting flat plate portion 46 of the non-conducting portion 40 in the case body 24 at a position opposite to the rigid board 22 with respect to the case body 24, while the key seat 30 sandwiches a key FPC 28 (will be explained later). The key seat 30 is configured such that a plurality of keytops 80 are attached onto a seat 78 made of silicone rubber.

Also, as shown in FIG. 1, a plurality of keyholes 82 are formed in an operation face 81 of the upper case 18 of the second housing 8, while the operation face 81 is opposite to a display face of the display unit 10 when the first housing 6 and the second housing 8 are folded with respect to each other. From the respective keyholes 82, depression faces are externally exposed and are employed in order to contact thereto fingers of a hand in the respective keytops 80 of the key seat 30. Then, when a finger of the hand is contacted so as to depress a depression face of this keytop 80, a rear face of this depression face depresses a key switch 84 (will be discussed later) corresponding to the depressed depression face.

Also, as shown in FIG. 2, the key FPC 28 is sandwiched between the conducting flat plate portion 42 of the conducting portion 38 and the non-conducting flat plate portion 46 of the non-conducting portion 40 in the case body 24, and also the key seat 30 so as to be arranged. The key FPC 28 includes a plurality of key switches 84 on the first face 28a on the side of the upper case 18, the second face 28b opposite to the first face 28a is mounted on the conducting flat plate portion 42 of the conducting portion 38 and the non-conducting flat plate portion 46 of the non-conducting portion 40 in the case body 24.

The key switches 84 of the key FPC 28 have metal domes 86, while the metal domes 86 are made of metal plates which are curved in bowl shapes in a three dimensional manner. When vertexes of these bowl shapes as to the metal domes 86 are depressed, these vertexes are made in contact with switch terminals of an electric circuit (not shown) which is printed on the key FPC 28, so that these metal domes 28 are electrically conducted.

In accordance with such a folding type portable telephone 2 related to the present embodiment, the antenna 50 is formed on the face 46b inside the non-conducting flat plate portion 46 of the non-conducting portion 40 of the case body 24, which is located apart from the reference potential pattern 32 of the rigid board 22. As a result, the area "S" (refer to FIG. 3) defined on the rigid board 22 can be made small, so that the rigid board 22 can be made compact. Eventually, the entire portion of the folding type portable telephone 2 can be made compact.

In other words, although not shown in the drawings, in such a case where an antenna (not shown) is arranged within the area "S" of the rigid board 22 as shown in FIG. 3, this antenna must be arranged separated from the reference potential pattern 32. As a result, the area "S" could not be made small. To the contrary, in the folding type portable telephone 2 related to the present embodiment, the antenna 50 is formed on the face 46b inside the non-conducting flat plate portion 46 of the non-conducting portion 40 of the case body 24, which is located apart from the reference potential pattern 32 of the rigid board 22. As a result, the area "S" defined on the rigid board 22 can be made small, so that the rigid board 22 can be made compact. Eventually, the entire portion of the folding type portable telephone 2 can be made compact.

Also, in accordance with the folding type portable telephone 2 related to the present embodiment, the terminals 34 which abut on the enlarged width portion 50a of the antenna 50 are provided in the area "S" as shown in FIG. 3. As a result, the antenna 50 can be electrically connected to the electric circuit provided on the rigid board 22 by merely mounting the case body 24 on the rigid board 22.

Also, the antenna matching circuit portion 36 is provided at the positions of the second face 22b on the rigid board 22, which correspond to the terminals 34. As a result, since the antenna matching circuit portion 36 is connected via a through hole (not shown) which is electrically conducted along the thickness direction of the rigid board 22, the circuit arrangement for connecting the antenna 50 to the antenna matching circuit portion 36 can be made simple, for instance, an area required for the circuit arrangement can be made narrow, and the like. Also, other electronic components related to the antenna matching circuit portion 36 and the antenna 50 can be arranged collectively and in a rational manner within the area "S", so that the rigid board 22 can be made compact.

Also, in the folding type portable telephone 2 according to the present embodiment, as shown in FIG. 2, the face 42a of the conducting flat plate portion 42 in the conducting portion 38, and the face 46a of the non-conducting flat plate portion 46 in the non-conducting portion 40 are formed such that the faces 42a and 46a are arranged adjacent to each other in the same plane, and furthermore, both the conducting rib 44 and the non-conducting rib 48 are formed in the same height. As a result, with respect to weight transferred between the rigid board 22, the strengths of the conducting portion 38 and the non-conducting portion 40 are supported by the conducting rib 44 and the non-conducting rib 48 formed in the same height, so that these strengths can be made substantially equal to each other.

In other words, while the keytops 80 of the key seat 30 and the switches 84 of the key FPC 28 corresponding to the keytops 80 are arranged on the face 42a of the conducting flat plate portion 42 in the conducting portion 38 (refer to FIG. 2), the conducting portion 38 can receive the weight produced when the keytops 80 are depressed by the hand during operation of the folding type portable telephone 2 by having the constant strength, whereas the non-conducting portion 40 similarly has such a strength equivalent to that of the conducting portion 38 and can receive the weight produced when the non-conducting portion 40 is depressed by the hand. As a consequence, the keytops 80 of the key seat 30 and the switches 84 of the key FPC 28 corresponding to the keytops 80 can be arranged also on the face 46a of the non-conducting flat plate portion 46 in the non-conducting portion 40, the keys can be widely distributed within the limited space without giving an adverse influence to the built-in type antenna 50.

Also, the key FPC 28 is arranged on the face 42a of the conducting flat plate portion 42 in the conducting portion 38 and the face 46a of the non-conducting flat plate portion 46 in the non-conducting portion 40. As a result, a structure for supporting the key FPC 28 other than the conducting portion 38 and the non-conducting portion 40 is no longer required within the second housing 8.

Since the conducting portion 38 and the non-conducting portion 40 are configured as the separate members, even when the core member of the conducting portion 38 has the non-conducting characteristic similar to that of the non-conducting portion 40, such members whose materials have different characteristics from each other may be employed in the conducting portion 38 and the non-conducting portion 40, respectively.

Further, the steps for manufacturing the conducting portion 38 and the non-conducting portion 40 can be independently carried out respectively until the conducting portion 38 is engaged with the non-conducting portion 40, and then the engaged conducting/non-conducting portions 38 and 40 are housed in the second housing 8 as the case body 24. As a result, degrees of freedom when the respective manufacturing steps are designed and/or changed can be increased.

Next, a description is made of a folding type portable telephone 60 (corresponding to a wireless communication terminal) according to a second TO embodiment of the present invention with reference to FIG. 1 to FIG. 3, FIG. 5, and FIG. 6. The folding type portable telephone 60 shown in these drawings will now be described with applying the same reference numerals for the same components of the above-described folding type portable telephone 2 according to the first embodiment.

As shown in FIG. 1, similar to the above-described folding type portable telephone 2 related to the first embodiment, the folding type portable telephone 60 according to the present embodiment includes a first housing 6 and a second housing 8; and as shown in FIG. 2, a rigid board 22, a key FPC 28, and a key seat 30 are housed in a space formed between an upper case 18 and a lower case 20 of the second housing 8 in a similar manner to that of the folding type portable telephone 2 related to the first embodiment.

Figure 5:
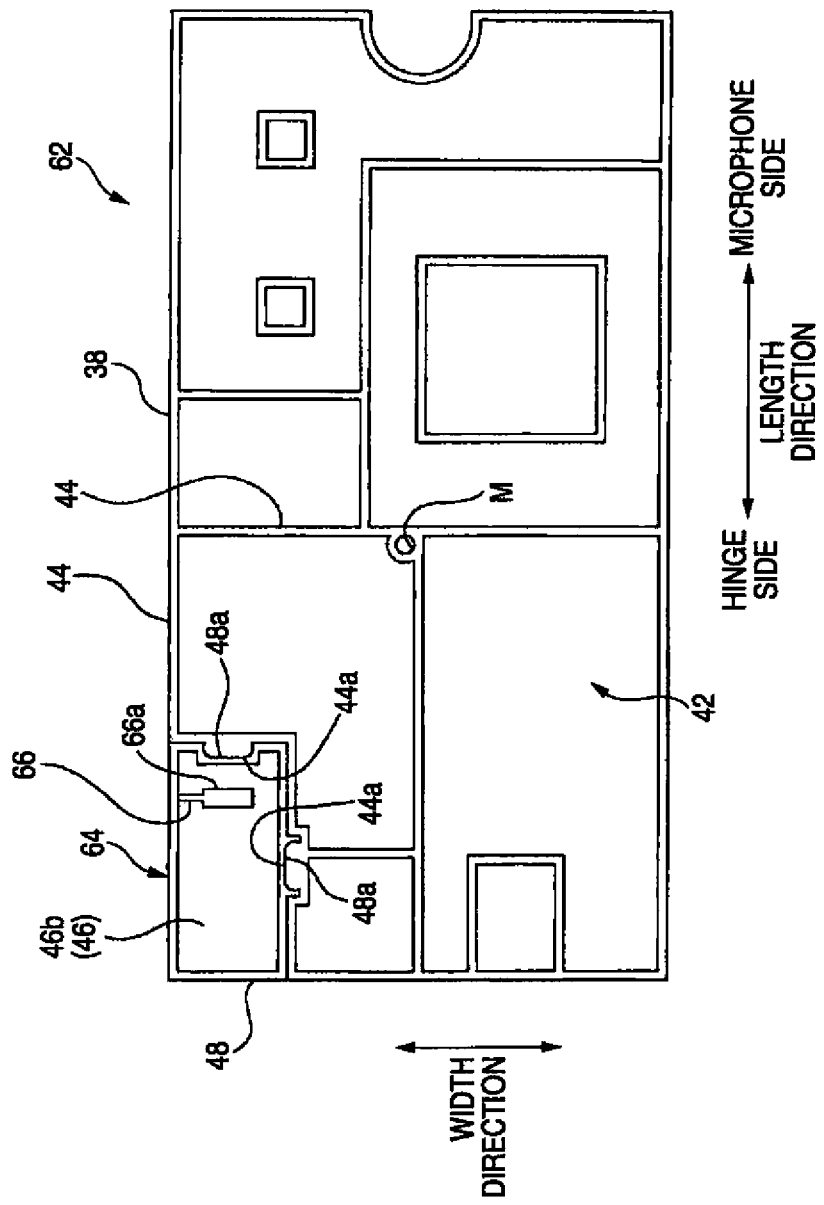
FIG. 5 is a diagram for indicating the case body 62 of the folding type portable telephone 60 according to the second embodiment of the present invention, taken along an arrow B-B line.

Then, instead of the case body 24 of the above-described folding type portable telephone 2 related to the first embodiment, in the folding type portable telephone 60 according to the present embodiment, as shown in FIG. 5, a case body 62 is provided. The case body 62 includes a conducting portion 38 and a non-conducting portion 64. The non-conducting portion 64 includes an antenna 66. This antenna 66 is formed over both a face 46b inside a non-conducting flat plate portion 46 and an inside face of a non-conducting rib 48 which intersects with the face 46b at an angle of 90 degrees and is continued to the face 46b adjacent to each other.

Figure 6:
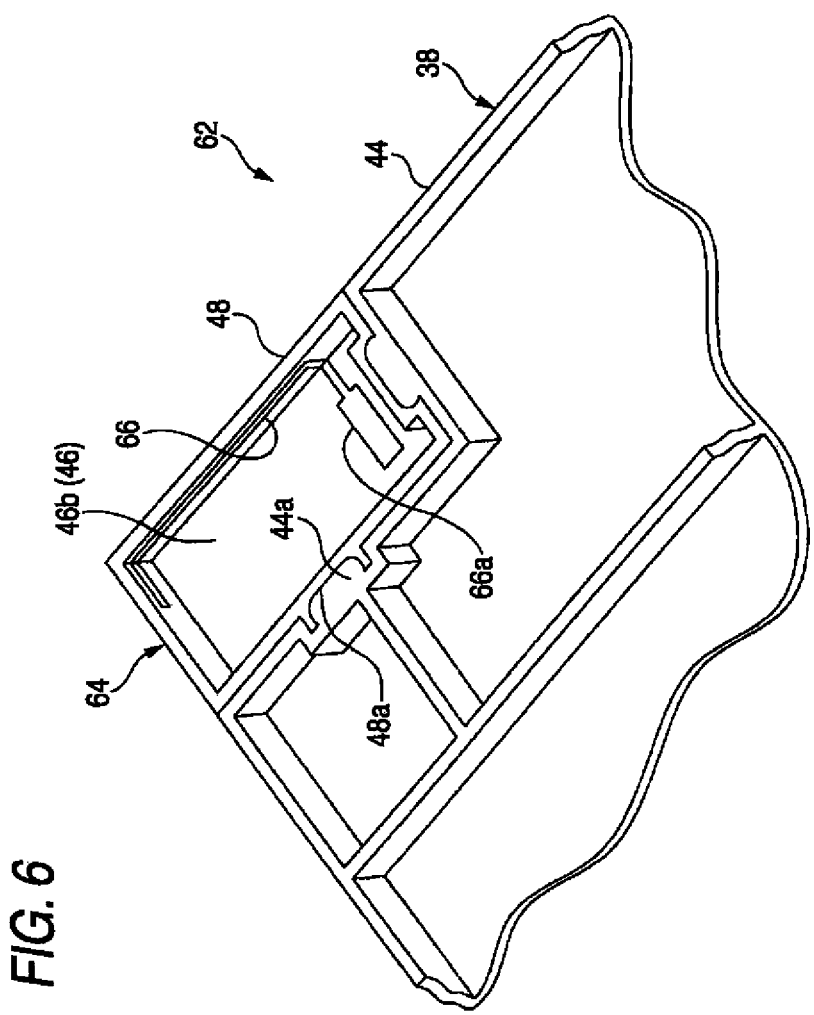
FIG. 6 is an enlarged perspective view for showing a non-conducting portion 64 of the case body 62 shown in FIG. 5.

In other words, as shown in FIG. 6, only one enlarged width portion 66a of the antenna 66 of the non-conducting portion 64 is arranged on the face 46b inside the non-conducting flat plate portion 46, and a length portion extended from this enlarged width portion 66a is formed on the face inside the non-conducting rib 48, while this face inside the non-conducting rib 48 intersects with the face 46b at an angle of 90 degrees, and also is continued to the face 46b adjacent to each other.

In accordance with such a folding type portable telephone 60 related to the present embodiment, similar to the above-described first embodiment, the antenna 66 is formed on the non-conducting rib 48 and the non-conducting flat plate portion 46 of the non-conducting portion 64 of the case body 62, which are located apart from the reference potential pattern 32 of the rigid board 22. As a result, an area "S" (refer to FIG. 3) defined on the rigid board 22 can be made small, so that the rigid board 22 can be made compact. Eventually, the entire portion of the folding type portable telephone 60 can be made compact.

Also, as shown in FIG. 6, the antenna 66 is formed such that the length portion of the antenna 66 extends on the face inside the non-conducting rib 48 of this antenna 66 along the parallel direction with respect to the face 46b. However, the antenna 66 is not limited only to such a shape, but may be alternatively manufactured in various shapes in the three-dimensional manner. As a consequence, as to which shape of the antenna 66 should be manufactured, according to required antenna characteristics, margins of shape selections, or margins of shape development can be largely widened.

Also, similar to the above-described first embodiment, in accordance with the folding type portable telephone 60 related to the present embodiment, the terminals 34 which abut on the enlarged width portion 66a of the antenna 66 are provided in the area "S" shown in FIG. 3. As a result, the antenna 66 can be electrically connected to the electric circuit provided on the rigid board 22 by merely mounting the case body 62 on the rigid board 22.

Also, similar to the above-described first embodiment, the antenna matching circuit portion 36 is provided at the positions of the second face 22b on the rigid board 22, which correspond to the terminals 34. As a result, since the antenna matching circuit portion 36 is connected via a through hole (not shown) which is electrically conducted along the thickness direction of the rigid board 22, the circuit arrangement for connecting the antenna 66 to the antenna matching circuit portion 36 can be made simple. That is, an area which is required to connecting the antenna 66 and the antenna matching circuit 36 is approximated to zero. Also, other electronic components related to the antenna matching circuit portion 36 and the antenna 66 can be arranged collectively and in a rational manner within the area "S" so that the rigid board 22 can be made compact.

Also, in the folding type portable telephone 60 according to the present embodiment, as shown in FIG. 2, similar to the above-described first embodiment, the face 42a of the conducting flat plate portion 42 in the conducting portion 38, and the face 46a of the non-conducting flat plate portion 46 in the non-conducting portion 64 are formed such that the faces 42a and 46a are arranged adjacent to each other in the same plane, and furthermore, both the conducting rib 44 and the non-conducting rib 48 are formed in the same height. As a result, with respect to weight transferred between the rigid board 22, the strengths of the conducting portion 38 and the non-conducting portion 64 can be made substantially equal to each other.

Also, similar to the above-described first embodiment, the key FPC 28 is arranged on the face 42a of the conducting flat plate portion 42 in the conducting portion 38 and the face 46a of the non-conducting flat plate portion 46 in the non-conducting portion 64. As a result, such a structure for supporting the key FPC 28 other than the conducting portion 38 and the non-conducting portion 64 is no longer required within the second housing 8.

Also, similar to the above-described first embodiment, since the conducting portion 38 and the non-conducting portion 64 are configured as the separate members, even when the core member of the conducting portion 38 has the electric non-conductive characteristic similar to that of the non-conducting portion 64, such members whose materials have different characteristics from each other may be employed in the conducting portion 38 and the non-conducting portion 64, respectively.

Also, as shown in FIG. 6, in the folding type portable telephone 60 according to the present embodiment, the antenna 66 is formed in the three-dimensional manner over both the face 46b inside the non-conducting flat plate portion 46 and an inside face of the non-conducting rib 48 which intersects with the face 46b at the angle of 90 degrees, and is continued to the face 46b adjacent to each other. As a result, the characteristic of the antenna 66 such as the directivity thereof may be made different from for example, a characteristic of an antenna formed in a plane manner.

Next, a description is made of a folding type portable telephone 90 (corresponding to a wireless communication terminal) according to a third embodiment of the present invention with reference to FIG. 1 FIG. 3, FIG. 7, and FIG. 8.

Figure 7:
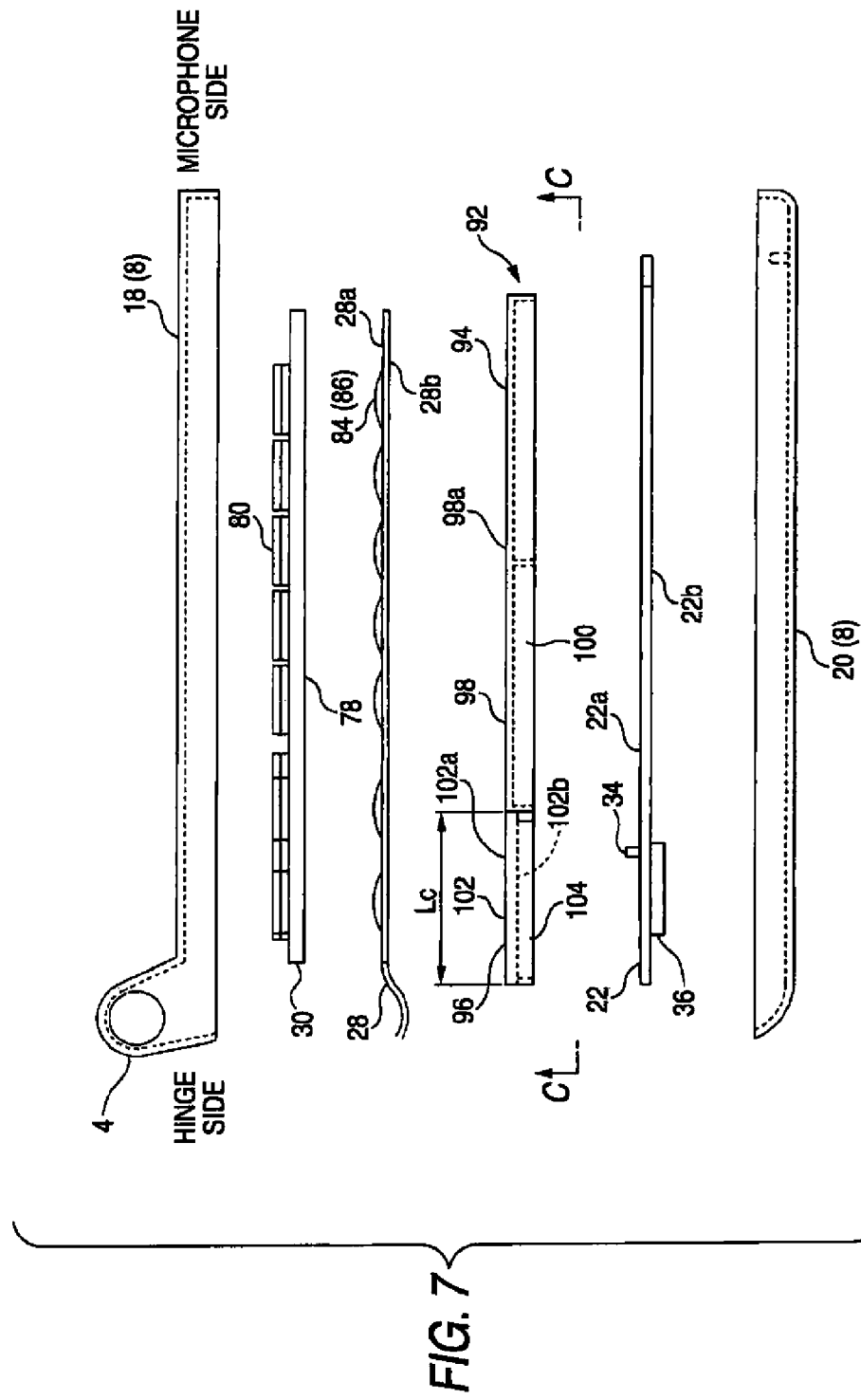
FIG. 7 is an exploded side view for indicating a folding type portable telephone 90 according to the third embodiment before an upper case 18 and a lower case 20 of a second housing 8 and a rigid board 22, a case body 92, a key FPC 28, and a key seat 30 which are housed in the second housing 8 as shown in FIG. 1 are assembled.

As shown in FIG. 1, similar to the above-described folding type portable telephone 2 related to the first embodiment, the folding type portable telephone 90 according to the present embodiment is equipped with a first housing 6 and a second housing 8; and as shown in FIG. 7, a rigid board 22, a key FPC 28, and a key seat 30 are housed in a space formed between an upper case 18 and a lower case 20 of the second housing 8 in a similar manner to that of the folding type portable telephone 2 related to the first embodiment.

Figure 8:
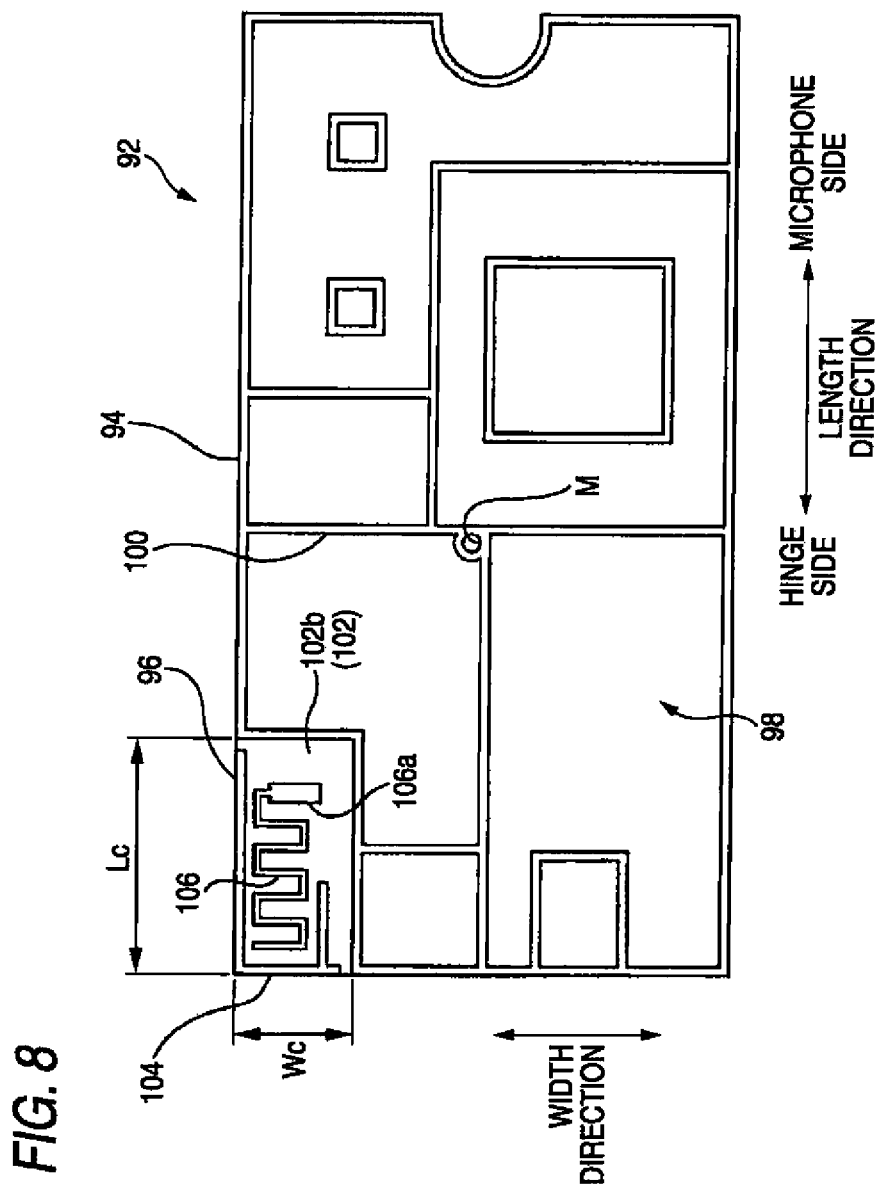
FIG. 8 is a diagram for showing the case 92 shown in FIG. 7, taken along an arrow C-C line.

Then, instead of the case body 24 of the above-described folding type portable telephone 2 related to the first embodiment, in the folding type portable telephone 90 according to the present embodiment, as shown in FIG. 7 and FIG. 8, a case body 92 is provided. The case body 92 includes a conducting portion 94 and a non-conducting portion 96. The non-conducting portion 96 is defined by such a portion indicated by a dimension "Lc" and a dimension "Wc" in FIG. 8, and is provided at one corner portion within the plane shape thereof on the side of the hinge 4. The conducting portion 94 occupies the case body 92 except for the non-conducting portion 96. The conducting portion 94 and the non-conducting portion 96 are formed with each other in an integral structure.

Similar to the conducting portion 38 of the folding type portable telephone 2 related to the above-described first embodiment, the conducting portion 94 includes a conducting flat plate portion 98, and a conducting rib 100 which is provided to stand on this conducting flat plate portion 98. Also, the non-conducting portion 96 includes a non-conducting flat plate portion 102, and a non-conducting rib 104 which is provided to stand on this non-conducting flat plate portion 102. Although different names are once given to the conducting flat plate portion 98 and the non-conducting flat plate portion 102, both of these conducting/non-conducting flat plate portions 98 and 102 are actually manufactured such that the same members are continued to each other in an integral manner.

As shown in FIG. 7, similar to the face 46a (refer to FIG. 2) of the non-conducting flat plate portion 46 of the folding type portable telephone 2 according to the above-described first embodiment, a face 102a of the non-conducting flat plate portion 102 in the non-conducting portion 96 on the side of the upper case 18 is located adjacent to a face 98a of the conducting flat plate portion 98 in the conducting portion 94 on the side of the upper case 18 in the same plane.

As shown in FIG. 8, although the non-conducting rib 104 of the non-conducting portion 96 has a different plane shape from that of the non-conducting rib 48 (refer to FIG. 4) of the folding type portable telephone 2 according to the first embodiment, this non-conducting rib 104 of the non-conducting portion 96 is formed at the same height as that of the conducting rib 100 of the conducting portion 94.

Also, while a core member of the case body 92 has an electric non-conductive characteristic, the conducting portion 94 is configured such that an electric conductive layer made of a metal material is formed on a surface of a portion within this core member, which corresponds to the conducting portion 94, by performing a vapor deposition method, or the like.

Also, as shown in FIG. 8, the non-conducting portion 96 includes an antenna 106 which is formed on the face 102 inside the non-conducting flat plate portion 102. While the antenna 106 has only one enlarged portion 106a, a length portion extended from this enlarged width portion 106a is formed in a rectangular wave shape by being alternately bent.

The antenna 106 corresponds to an electric conductive layer made of a metal material, which is formed on a face inside such a portion corresponding to the non-conducting portion 96 from which the core member of the case body 92 is exposed. Similar to the electric conductive layer of the conducting portion 94, the above-described electric conductive layer made of the metal material can be manufactured by executing either a vapor deposition method or a plating method. As a consequence, this electric conductive layer may be alternatively manufactured at the same time when the electric conductive layer of the conducting portion 94 is formed.

For example, with respect to the core member of the case body 92 before both the antenna 106 and the conducting portion 94 are manufactured, such a portion corresponding to the non-conducting portion 96 is masked except for a portion where the antenna 106 is formed, and thereafter, if an electric conductive layer is formed over the entire surface of the core member by performing either a vapor deposition method or a plating method and the masked portion is removed, then both the antenna 106 and the electric conductive layer of the conducting portion 94 are manufactured at the same time.

In accordance with such a folding type portable telephone 90 related to the present embodiment, similar to the above-described first embodiment and second embodiment, the antenna 106 is formed on the non-conducting flat plate portion 102 of the non-conducting portion 96 of the case body 92, which is located apart from the reference potential pattern 32 of the rigid board 22. As a result, the area "S" (refer to FIG. 3) defined on the rigid board 22 can be made small, so that the rigid board 22 can be made compact. Eventually, the entire portion of the folding type portable telephone 90 can be made compact.

Also, similar to the above-described first embodiment and second embodiment, in accordance with the folding type portable telephone 90 related to the present embodiment, the terminals 34 which abut on the enlarged width portion 106a of the antenna 106 are provided with the area "S" indicated in FIG. 3. As a result, the antenna 106 can be electrically connected to the electric circuit provided on the rigid board 22 by merely mounting the case body 92 on the rigid board 22.

Also, similar to the above-described first embodiment and second embodiment, the antenna matching circuit portion 36 is provided at the positions of the second face 22b on the rigid board 22, which correspond to the terminals 34. As a result, since the antenna matching circuit portion 36 is connected via a through hole (not shown) which is electrically conducted along the thickness direction of the rigid board 22, the circuit arrangement for connecting the antenna 106 to the antenna matching circuit portion 36 can be made simple. Also, other electronic components related to the antenna matching circuit portion 36 and the antenna 106 can be arranged collectively and in a rational manner within the area "S", so that the rigid board 22 can be made compact.

Also, in the folding type portable telephone 90 according to the present embodiment, as shown in FIG. 7, the face 98a of the conducting flat plate portion 98 in the conducting portion 94, and the face 102a of the non-conducting flat plate portion 102 in the non-conducting portion 96 are formed such that the faces 98a and 102a are continuously formed in an integral manner by employing the same single plate. Furthermore, both the conducting rib 100 and the non-conducting rib 104 are formed in the same height. As a result, with respect to weight transferred between the rigid board 22, the strengths of the conducting portion 94 and the non-conducting portion 96 can be made substantially equal to each other.

Also, the key FPC 28 is arranged on the same continuous face as to the face 98a of the conducting flat plate portion 98 in the conducting portion 94 and the face 102a of the non-conducting flat plate portion 102 in the non-conducting portion 96. As a result, such a structure for supporting the key FPC 28 other than the conducting portion 96 and the non-conducting portion 94 is no longer required within the second housing 8.

Also, since the conducting portion 94 and the non-conducting portion 96 are manufactured in an internal structure, the assembling work of the folding type portable telephone 90 can be made simple, and also, the antenna 106 and the electric conductive layer of the conducting portion 94 can be formed at the same time.

It is noted that in the above-described folding type portable telephone 2 related to the first embodiment, the area "S" defined on the rigid board 22 is arranged at one corner portion in this rigid board 22 on the side of the hinge 4, and the non-conducting portion 40 is provided at one corner position in the case body 24 on the side of the hinge 4. However, the position of the area "S" defined on the rigid board 22 and the position of the non-conducting portion 40 in the case body 24 are not limited only to the above-described positions. This can be also applied to the second embodiment and the third embodiment.

Also, in the folding type portable telephones 2 and 60 according to the first embodiment and the second embodiment, the conducting portion 38 is arranged such that the core member having the electric non-conductive characteristic is employed, and the electric conductive layer is formed on the surface of this core member. Alternatively, the conducting portion 38 may be formed by employing a metal plate, and the electric conductive layer may not be formed on the surface of the core member.

Also, in the folding type portable telephone 60 according to the second embodiment, the antenna 66 is formed such that the length portion extending from the enlarged width portion 66a are bridged over both the face 46b inside the non-conducting flat plate portion 46 and the inside face of the non-conducting rib 48 which is continuously located adjacent to the above-described face 46b. Alternatively, the antenna 66 may be manufactured such that the length portion extending from the enlarged width portion 66a is extended from both the face 46b inside the non-conducting flat plate portion 46 and the face inside the non-conducting rib 48, passes through a tip face of the non-conducting rib 48 along the height direction, and then, is extended up to the face outside the non-conducting rib 48, or the face 46a outside the non-conducting flat plate portion 46. This can be also applied to the third embodiment.

Also, in the folding type portable telephone 2 according to the first embodiment, the antenna 50 is formed on the face 46b inside the non-conducting flat plate portion 46 in the non-conducting portion 40. Instead of this antenna 50, an antenna may be alternatively formed which has such a length bridged over both the face 46b inside the non-conducting flat plate portion 46 and the inside face of the non-conducting rib 48 which is continuously located adjacent to the face 46b, and further, the tip face of this non-conducting rib 48 along the height direction thereof. In this alternative case, the terminals 34 on the rigid board 22 shown in FIG. 3 may be arranged at such positions that the terminals 34 abut on the antenna at the tip face of the non-conducting rib 48 along the height direction within the area "S." As a result the terminals 34 may be made small. This can be also applied to the second embodiment and the third embodiment.

Also, in the first to third embodiments, the present invention is described in such a case that the inventive concept thereof is applied to the folding type portable telephones 2, 60, and 90. Alternatively, as apparent from the foregoing descriptions, the inventive concept of the present invention may be applied to other wireless communication terminals such as portable telephones except for the folding type portable telephones 2, 60, and 90; PHSs (Personal Handy phone Systems); PDAs (Personal Digital Assistants); and portable navigation apparatuses.

The present patent application is filed based upon Japanese Patent Application (JP-A-2005-314318) filed on Oct. 28, 2005, the contents of which are incorporated herein by reference.

The invention claimed is:

1. A wireless communication terminal comprising:
a first circuit board including a reference potential pattern and an electronic component;
a shield case including a conducting portion and a non-conducting portion that are separate members and that are engaged with each other;
an antenna; and
a housing which houses therein the first circuit board, the shield case and the antenna, wherein:
the conducting portion of the shield case is electrically conducted to the reference potential pattern and shields the electronic component from a noise in a state where the shield case is attached to the first circuit board, and
the antenna is formed on the surface of the non-conducting portion of the shield case, wherein:
the conducting portion includes:
a conducting flat plate portion formed in parallel to the first circuit board; and
a conducting rib which stands on the conducting flat plate portion to a side of the first circuit board and abuts on the reference potential pattern, and which surrounds at least a portion of an area of the first circuit board, on which the electronic component is disposed, and
the non-conducting portion includes:
a non-conducting flat plate portion formed in parallel to the first circuit board, wherein a face of the non-conducting flat plate portion opposite to the first circuit board is arranged adjacently in a same plane as a face of the conducting flat plate portion opposite to the first circuit board; and
a non-conducting rib which stands on the non-conducting flat plate portion to the side of the first circuit board at a same height as the conducting rib.

2. The wireless communication terminal according to claim 1, wherein the first circuit board includes a power supply terminal within an area opposite to the non-conducting portion, and the power supply terminal is configured to abut on the antenna.

3. The wireless communication terminal according to claim 2, wherein a matching circuit portion for the antenna is provided on the first circuit board at a position corresponding to the power supply terminal on a face opposite to a face on which the power supply terminal is provided.

4. The wireless communication terminal according to claim 2, wherein the power supply terminal stands from the first circuit board toward the antenna to abut the antenna.

5. The wireless communication terminal according to claim 2, wherein the power supply terminal is a leaf spring type terminal.

6. The wireless communication terminal according to claim 1, further comprising:
a second circuit board which includes a key switch and which is provided on faces of the conducting flat plate portion and the non-conducting flat plate portion opposite to the first circuit board.

7. The wireless communication terminal according to claim 1, wherein the antenna is formed over both of a face of the non-conducting flat plate portion, which faces the first circuit board, and an inside face of the non-conductive rib which stands on the non-conducting flat plate portion to the first circuit board.

8. The wireless communication terminal according to claim 1, wherein:
a core member of the shield case includes no electric conductivity;
the conducting portion is configured by forming an electric conductive layer on a face of the core member except for the non-conducting portion; and
the antenna is configured to be an electric conductive layer which is formed to have a predetermined plane shape on the face of the core member of the non-conducting portion.

9. The wireless communication terminal according to claim 1, wherein the shield case is a separate member from the housing.

10. The wireless communication terminal according to claim 1, wherein an area opposite to the non-conducting portion is not provided with the reference potential pattern.

11. The wireless communication terminal according to claim 1, wherein the shield case includes a non-conductive rib standing from a surface of the shield case toward the first circuit board and surrounding the non-conducting portion.

12. The wireless communication terminal according to claim 1, wherein the conducting rib is provided at an entire border between the conducting portion and the non-conducting portion.

* * * * *